United States Patent [19]

Kitabatake et al.

[11] Patent Number: 4,997,124

[45] Date of Patent: Mar. 5, 1991

[54] VACUUM-INSULATED, DOUBLE-WALLED METAL STRUCTURE AND METHOD FOR ITS PRODUCTION

[75] Inventors: Akihiro Kitabatake; Akihiro Kamata, both of Nara; Kazuhiro Nishikawa, Itami; Mamoru Fujiyama, Nara, all of Japan; Ikuo Kawamoto, Bankok, Thailand

[73] Assignee: Zojirushi Corporation, Osaka, Japan

[21] Appl. No.: 340,644

[22] Filed: Apr. 20, 1989

[30] Foreign Application Priority Data

Apr. 20, 1988 [JP] Japan .................................. 63-98855
Apr. 20, 1988 [JP] Japan .......................... 63-54095[U]
May 27, 1988 [JP] Japan ................................ 63-130737

[51] Int. Cl.$^5$ .................... B23K 31/02; A47J 41/02
[52] U.S. Cl. ..................................... 228/184; 228/190; 228/217; 228/221; 228/234; 285/287; 285/142; 220/430; 220/424
[58] Field of Search ............... 228/184, 190, 217, 221, 228/234; 285/287, 142, 143, 148; 220/420, 424, 425, 453, 454, 465

[56] References Cited

U.S. PATENT DOCUMENTS 3,656,225 4/1972 Bereza ................................. 228/221
4,077,114 3/1978 Sakuma ............................... 228/221
4,427,123 1/1984 Komeda et al. .................... 220/424
4,856,174 8/1989 Ishizaki et al. ..................... 220/424

FOREIGN PATENT DOCUMENTS 50271 3/1982 Japan ................................. 228/221
83770 5/1985 Japan ................................. 228/221
40968 2/1987 Japan ................................. 228/221
1441122 6/1976 United Kingdom ............... 228/221

Primary Examiner—Sam Heinrich
Attorney, Agent, or Firm—Jones, Tullar & Cooper

[57] ABSTRACT

A vacuum-insulated, double-walled metal structure comprises inner and outer shells made of a metal and seamed together to form a double-walled structure with a space between them, the space being exhausted of air. At least one of the inner and outer shells is provided with at least one activated foil of a metal selected from the group consisting of copper, titanium and zirconium. The inner shell may be wound with an activated titanium or zirconium foil, and covered by another metal foil selected from the group consisting of copper, aluminum, titanium and zirconium, except for a part of its bottom. The metal foil wound on the metal structure is activated by preliminarily exhausting air from the space so that a pressure therein becomes reduced to a low vacuum of the order of $10^{-2}$ Torr, and then heating the double-walled structure at not less than about 400° C.

2 Claims, 5 Drawing Sheets

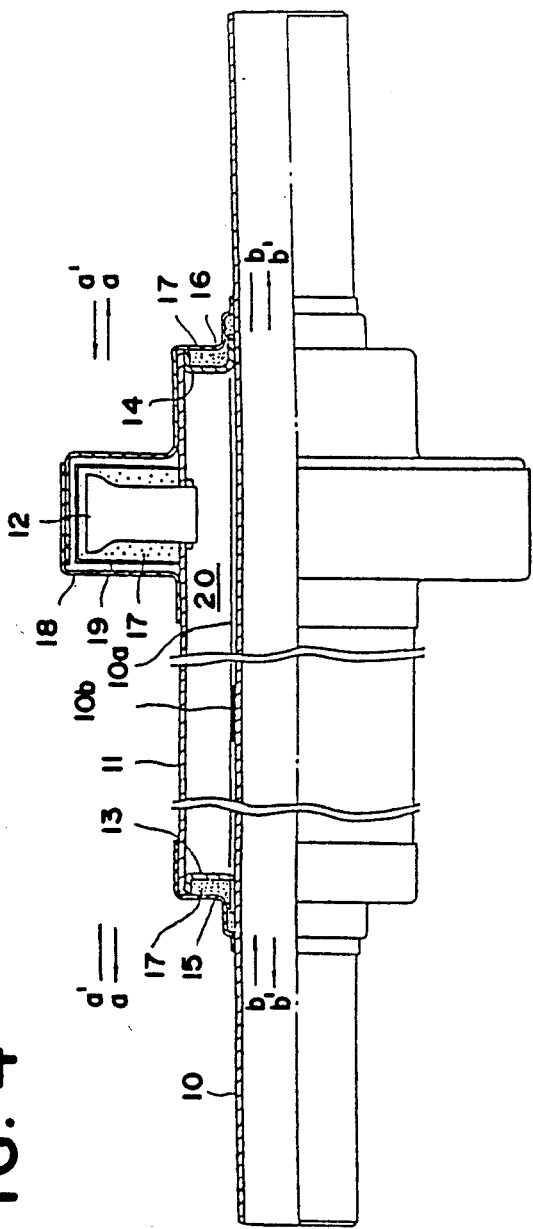
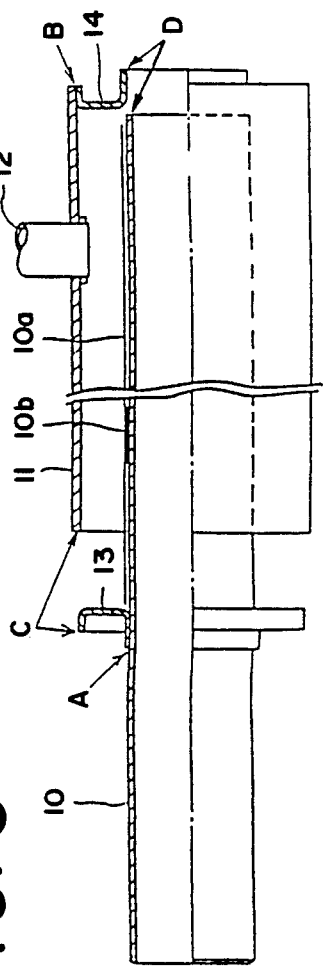
FIG. 4
FIG. 5

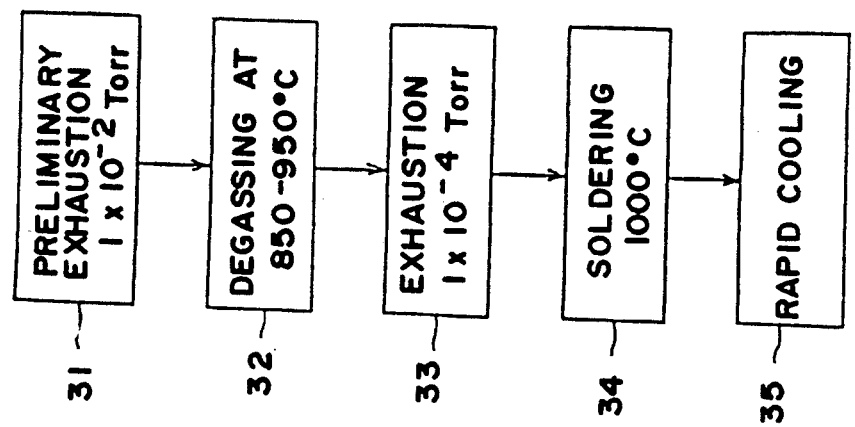
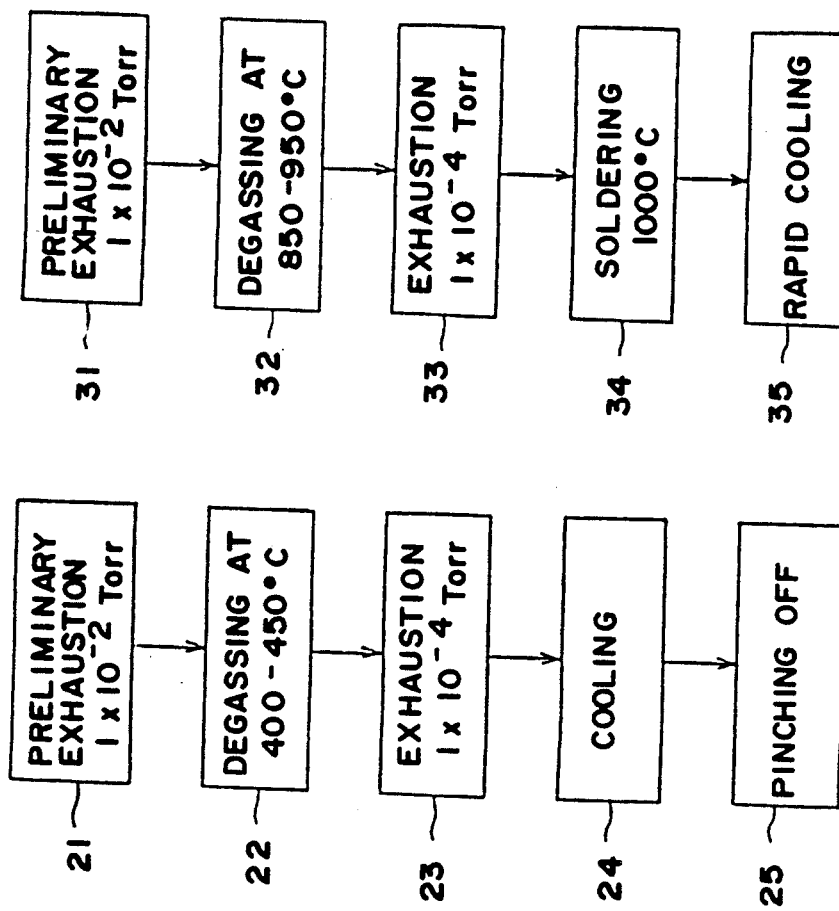
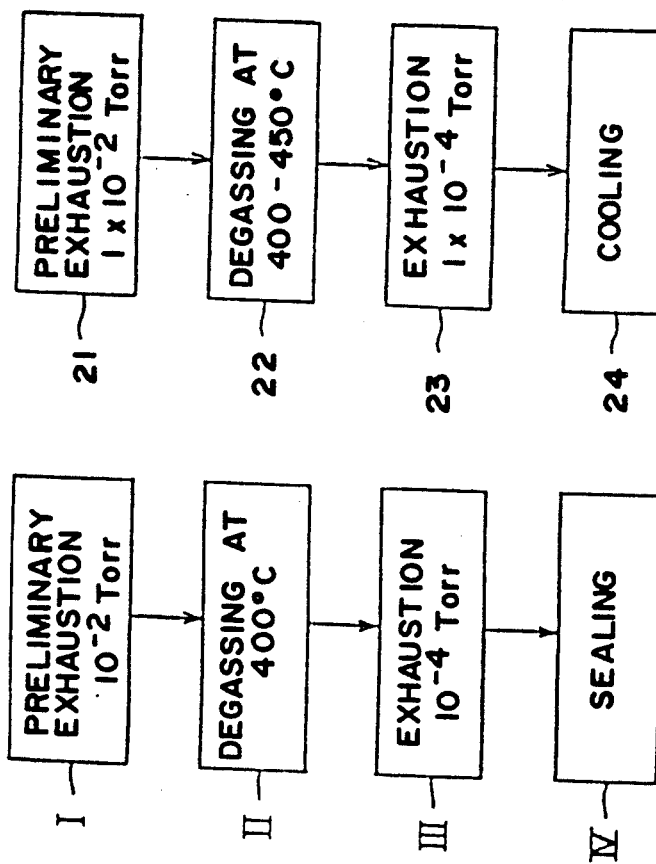

VACUUM-INSULATED, DOUBLE-WALLED METAL STRUCTURE AND METHOD FOR ITS PRODUCTION

BACKGROUND OF THE INVENTION

1. Field of the Invention

The present invention relates to a vacuum-insulated, double-walled metal- structure, such as, for example, vacuum bottles, nonfreezing pipes for example, and a method for its production.

2. Description of the Prior Art

A vacuum-insulated, double-walled metal structure, for example, a vacuum bottle, generally comprises inner and outer metal shells seamed together at their opening ends, a space formed between the inner and outer shells being exhausted of air. In order to increase the thermal insulating properties of the vacuum bottle, it is common practice to coat the surfaces of the inner and outer shells defining the vacuum space with a reflective layer which prevents any radiation from the inside of the bottle to the outside, and vice versa. Such a reflective layer is generally made of a metal such as silver, nickel or copper, deposited on the surfaces of the inner and outer shells defining the vacuum space by electroplating or electroless plating. However, the plating is time-consuming, resulting in increase in a production cost of the vacuum bottle.

To solve such a problem, it has been proposed to cover the outer surface of the inner shell with an aluminum or copper foil which serves as a reflective layer, in laid open Japanese patent No. 61-31111. The use of aluminum or copper foil makes it possible to reduce the time required for the formation of the reflective layer on the inner shell, but it also has the following disadvantages as well as those of the prior art.

In producing a vacuum bottle, it is necessary to heat the double-walled bottle during exhausting air from the space between the inner and outer shells to remove absorbed gases from the surfaces of inner and outer shells as well as to clean the surfaces of the inner and outer shells defining the vacuum space. However, if the heat treatment is carried out under the presence of air, the aluminum or copper foil is oxidized as well as the plating, resulting in considerable decrease in the reflective properties.

In order to prevent the reflective layer from oxidizing, the heat or degassing treatment has been generally performed after exhausting air from the space between the inner and outer shells so that the pressure in the space is reduced to a high vacuum of not less than $1 \times 10^{-3}$ Torr. However, the temperature rise of the inner shell is considerably decreased since the thermal transfer due to convection scarcely occur under such a high vacuum. Thus, the heat treatment takes a lot of time. In addition, it is difficult to remove the absorbed gases from the outer surface of the inner shell sufficiently. If the gases adhered to or absorbed in the surfaces of inner and outer shells are not removed sufficiently therefrom during exhaustion, they would gradually leave the surfaces of the inner and outer shells afterward, reducing considerably the vacuum in the space, and so decreasing the thermal insulating properties of the vacuum bottle.

In order to prevent the vacuum bottle from lowering of the thermal insulating properties, there have widely been used getters which absorb gases released from the surfaces of the inner and outer shells. However, such a getter is generally of a pellet or disk form, so that it is required to use a fixture or a suitable means for fixing it to the inner or outer shell. Thus, the use of such a fixture is troublesome and causes increase in the production cost of the vacuum bottle.

SUMMARY OF THE INVENTION

It is therefore an object of the present invention to provide a low-cost vacuum-insulated, double-walled metal structure with excellent heat insulating properties.

A further object of the present invention is to provide a method for producing a vacuum-insulated, double-walled metal structure, which makes it possible to remove absorbed gases from surfaces of the inner and outer shells in a short time.

Another object of the present invention is to provide a method for producing a vacuum-insulated, double-walled structure, which makes it possible to produce such a metal structure with excellent thermal insulating properties without the use of any specific getters or fixtures for its attachment.

These and other objects of the present invention are achieved by providing a vacuum-insulated, double-walled metal structure comprising inner and outer shells made of a metal and seamed together to form a double-walled structure with a space between them, the space being exhausted of air, with at least one of said inner and outer shells being provided with at least one activated foil of a metal selected from the group consisting of copper, titanium and zirconium.

According to the present invention there is also provided a vacuum-insulated, double-walled metal structure comprising inner and outer shells made of a metal and seamed together to form a double-walled structure with a space between them, the space being evacuated of air, the inner shell being wound with an activated titanium or zirconium foil and covered with a foil of a metal selected from the group consisting of copper, aluminium, titanium and zirconium, except for a part of its bottom.

Such a vacuum-insulated, double-walled metal structure may be produced by preparing inner shell and outer shell members, winding at least one metal foil selected from the group consisting of copper, titanium and zirconium foils on the inner shell, seaming the inner shell and outer shell members together to prepare a double-walled structure with a space between the inner and outer shells, and then exhausting air from the space by a series of steps diagrammed in FIG. 6. According to the present invention, the exhaustion is carried out in the following manner. In step 1 of FIG. 6, the air in the space is preliminarily exhausted so that a pressure therein is reduced to a low vacuum of the order of $10^{-2}$ Torr through a suction port or tip tube previously provided on the outer shell. Then the double-walled structure is heated at a temperature not less than about 400° C. to remove the gases from the surfaces of the inner and outer shells defining the space, as well as to activate the metal foil in step II, further exhausting the remaining air from the space so that the pressure therein is reduced to a high vacuum of the order of $10^{-4}$ Torr or above in step III, and then sealing its suction port or tip tube in step IV.

In the vacuum-insulated double-walled structure of the present invention, the activated metal foil serves not only to reflect radiation but to absorb gases which may remain in the space or leave the surfaces of the inner and outer shells defining the vacuum space. If occasion demands, any conventionally used getters may be used in combination with the activated metal foil. In such a case, it is preferred to arrange the getter between the inner bottle and the activated metal foil wound thereon. This makes it possible to place the getter in position without the use of any fixture since the activated metal foil serves as a means for fixing the getter on the surface of the inner shell.

In the present invention, the double-walled structure is heated in a vacuum of the order of $10^{-2}$ Torr, i.e., in a vacuum ranging from 100 Torr to about $10^{-2}$ Torr, so that the heat transfer from the outer shell to the inner shell is accelerated by the convection of the remaining gas in the space. This makes it possible to remove the absorbed gases from the surfaces of the inner shell sufficiently in a short time.

Further, the metal foil wound on the inner shell is activated during heating under the low vacuum by the reaction with the absorbed gases, and the thus activated metal foil, upon being allowed to cool, absorbs the gases remaining in the space. Thus, it is possible to obtain a high vacuum without the use of any conventional getters.

It is generally known that an amount of a specific gas absorbed by an activated getter at room temperature depends on the amount of the gases removed from the getter during its activation. Thus, if it is possible to activate any metal, it would absorb the gases chemically and the amount of gases absorbed in the metal would correspond to that of the gases released from the metal during its activation.

It has been found that titanium, zirconium and copper can be activated by heating them in an atmosphere of the order of $10^{-2}$ Torr at about 400° C. and up. For example, if titanium is placed in a chamber of stainless steel and then heated under a certain reduced pressure, it releases nitrogen ($N_2$), hydrogen ($H_2$) and carbon monoxide (CO). The thus treated titanium, when being cooled to room temperature, absorbs these gases. Since a peak temperature at which an amount of nitrogen released from titanium becomes a maximum is about 400° C., and that for hydrogen is about 700° C., the titanium can be activated by heating it at about 400° C. and up while reducing the atmospheric pressure. Thus, the activated titanium can be used as a getter. In fact, it has been observed that the activated titanium foil of about 0.8 g absorbs 0.5 g of nitrogen, which stand comparison with that of the getter material (0.5 g) of the prior art. Similarly, zirconium releases both nitrogen and hydrogen at about 300° C. Thus, if titanium or zirconium foil is treated as above, it absorbs nitrogen or hydrogen.

On the other hand, if a copper foil is placed in a chamber of stainless steel and then heated under a certain reduced pressure, it releases water vapor ($H_2O$), carbon dioxide ($CO_2$) and carbon monoxide (CO). A minor amount of hydrogen ($H_2$) is also released from the copper. Analysis of the released amount of water vapor showed that it has peaks at 120°, 240° and 370° C. It is believed that water vapor released at 120° C. is the one adhered to or absorbed in the surface of the copper foil, while water vapor released at 240° C. and 370° C. are those produced by chemical reactions between copper oxides and hydrogen diffused in the copper foil. Analysis of carbon oxides (CO and $CO_2$) showed that they have peak temperatures at 240° and 400° C. It is believed that the carbon oxides are produced by the reaction of oxygen present in the form of copper oxides with carbon diffused in the copper foil. Also, hydrogen ($H_2$) is released from the surfaces of the copper foil without causing reaction with oxygen. The amount of hydrogen (including that in the form of water vapor) released from copper foil (about 12 g) corresponds to that of hydrogen released from a generally used getter (e.g., SAES GETTERS, st-707 product of S.P.A, 0.5 g). Accordingly, it is possible to use titanium, zirconium and copper foil singly or in combination, instead of the conventionally used getter, by heating it under the reduced pressure at a temperature of not less than 400° C.

The space formed between the inner and outer shells may be exhausted of air through a tip tube or a suction port previously provided on the outer shell. When the tip tube provided on the outer shell is used as an opening for exhaustion, the double-walled structure is heated at a temperature of about 400° to 450° C. and the tip tube is pinched off at that temperature after the pressure in the space has been reduced to a high vacuum of not less than $10^{-4}$ Torr In contrast therewith, if the suction port provided in the outer shell is used as the opening for exhaustion, it is required to perform heat treatment, exhaustion and soldering at a high temperature of 850° C. and above. Further, it is required to perform rapid heating and cooling of the double-walled structure to avoid intergranular corrosion due to sensitization of stainless steel. Because, if the soldering is carried out with any flux, it causes decrease in the vacuum as the gas produced from the flux enters into the space between the inner and outer shells. Further, if the stainless steel is maintained at a temperature of from 450° to 850° C. for a long time, carbon contained therein becomes carbonates, causing sensitization of the stainless steel. Thus, it is required to use a solder with a high melting point of about 900° to 1000° C., which makes it possible to perform soldering without use of any flux.

These and other objects, features and advantages of the invention will be further apparent from the following description taken in conjunction with the accompanying drawings which show, by way of example only, a metal vacuum vessel and a nonfreezing pipe embodying the present invention.

BRIEF DESCRIPTION OF THE DRAWINGS

FIG. 4 is a partially cut-away view of a vacuum-insulated double-walled pipe, showing still another embodiment of the present invention;

FIG. 5 is a partially cut-away side view of the double-walled pipe of FIG. 4, showing a step of its production where an inner shell is being inserted into the outer shell;

FIGS. 6 to 8 are diagrams each showing a series of production steps of a vacuum-insulated, double-walled structure according to the present invention;

DETAILED DESCRIPTION OF THE PREFERRED EMBODIMENT

Figure 1:
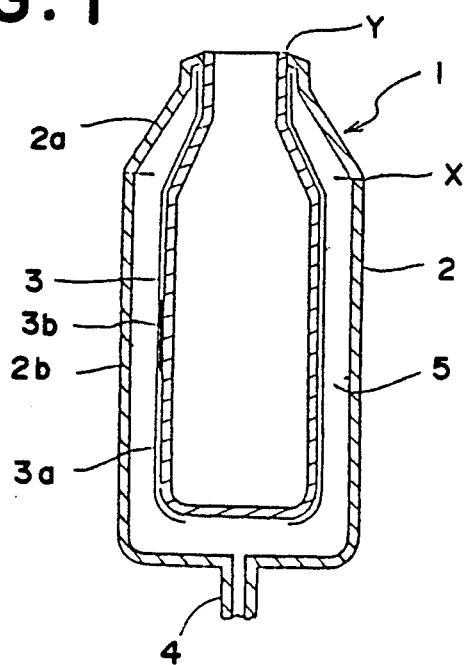
FIG. 1 is a section view of a metal vacuum vessel according to the present invention.

Referring now to FIG. 1, there is shown a metal vacuum bottle 1 embodying the present invention, comprising an outer shell or bottle 2 and an inner shell or bottle 3, which are made of a stainless steel and seamed together at the top ends of their openings Y to form a double-walled bottle with a space 5 between the inner and outer shells 2, 3, the space 5 being exhausted of air. The inner bottle 3 is covered with an activated titanium foil 3b with a thickness of 25 $\mu$m and a weight of 0.8 g, and an activated copper foil 3a with a thickness of 16.6 $\mu$m and a weight of 12 g, except for a central portion at its bottom. At the bottom of the outer bottle 2, there is provided a tip tube 4 for exhaustion of air.

The above metal vacuum bottle can be produced in the following manner. Using a stainless steel sheet, there are prepared an upper member 2a and lower member 2b. The lower member 2b is then provided at a central portion of its bottom with a tip tube 4. Also, there are prepared an inner barrel with a neck portion, and an inner bottom member, which are then seamed together by welding to form the inner bottle 3. The inner bottle 3 is wound with a slender titanium foil 3b, and further wound with a sheet of copper foil 3a except for a top end of its neck portion and a central part of the bottom wall that faces the opening of the tip tube. The inner bottle 3 is then seamed at the tip Y of the neck portion with the upper member 2a, with which the lower member 2b is seamed at X to form a double-walled bottle with a space between the inner and outer bottles.

The thus prepared double-walled bottle is treated by a series of steps diagrammed in FIG. 7 to complete the vacuum bottle. The double-walled bottle is placed in a furnace, and its tip tube 4 is connected to a vacuum pump. The space 5 is preliminarily exhausted of the air through the tip tube 4 until the pressure in the space 5 becomes reduced to about $10^{-2}$ Torr, as shown in step 21 of FIG. 7. Since the bottom of the inner bottle 3 facing the tip tube is not covered with the copper foil 3a, no suction of the copper foil 3a takes place.

Under such a low vacuum, the double-walled bottle is heated in step 22 to a temperature of 400° to 450° C. to remove gases adhered to or absorbed in the surfaces of the inner and outer bottles defining the space as well as to activate the copper foil 3a and titanium foil 3b. During heat treatment, the outer bottle 2 is directly heated by the heat from the furnace, while the inner bottle 3 is heated by radiation, thermal conduction from the outer bottle 2 at the seamed portion between the inner and outer bottles, and convection caused by the remaining gases in the space 5.

Although the pressure in the space 5 of the double-walled bottle is reduced to $1 \times 10^{-2}$ Torr, the heat transfer from the outer bottle 2 to the inner bottle 3 is scarcely damaged by preliminary exhaustion since the heat transfer due to convection becomes a dominant factor even under such a low vacuum. Accordingly, the inner bottle 3 is heated to the predetermined temperature in 10 to 20 minutes, and the gases absorbed in the surface of inner bottle 3 are released therefrom into the space 5 as well as that of the outer bottle 2, thus making it possible to perform degassing sufficiently in a short time. At the same time, the copper foil 3a and titanium foil 3b are activated by heating as they release the absorbed gases such as water vapor ($H_2O$), nitrogen ($N_2$), carbon dioxide ($CO_2$), carbon monoxide (CO), etc. Since the heating is carried out at a temperature below the temperature range where sensitization of stainless steel takes place, there is no fear of intercorrosion due to sensitization.

After heat treatment, the double-walled bottle is further exhausted of the remaining gas until the pressure is reduced to a high vacuum of about $10^{-4}$ Torr, in step 23 of FIG. 7. During this step, the double-walled bottle is maintained to the same temperature as that of the heat treatment in step 22, and the gases remaining in the space 5 and released from the surfaces of the inner and outer bottles, copper foil 3a and titanium foil 3b are exhausted through the tip tube 4. Then, the double-walled bottle is allowed to cool under a high vacuum in step 24, and the tip tube 4 is pinched off to complete a metal vacuum bottle in step 25.

The activated copper foil 3a serves as the reflective layer and absorbs hydrogen ($H_2$) remaining in the space or released from the surfaces of the outer and inner bottles 2 and 3 defining the vacuum space, while the activated titanium foil 3b absorbs nitrogen ($N_2$) remaining in the space or released from the surfaces of the outer and inner bottles 2 and 3. Thus, the space between the outer and inner bottles 2 and 3 is kept at a high vacuum for a long period of time, and the vacuum bottle possesses excellent thermal insulating properties.

Figure 2:
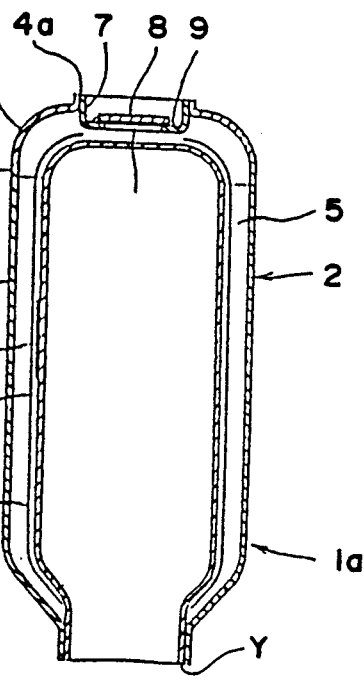
FIG. 2 is a section view of a vacuum-insulated double-walled vessel, showing another embodiment of the present invention.
Figure 3:
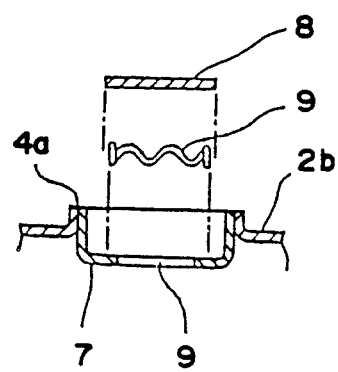
FIG. 3 is a partially enlarged section view of a double-walled vessel of FIG. 2.

Referring now to FIGS. 2 and 3, there is shown another embodiment of the present invention. The metal vacuum bottle 1a has the same structure as that of FIG. 1 except that the tip tube 4 is replaced with a suction port 6 adapted to be closed by a lid member 8. The outer bottle 2 is provided at its bottom with an opening 4a, to which a cylindrical member 7 with the suction port 6 is seamed by welding. The suction port 6 is closed by brazing a lid member 8 to the cylindrical, member 7 with a soldering material. Exhaustion of the space 5 is carried out as follows.

For example, the above metal vacuum bottle 1a may be produced in the following manner. After preparing a double-walled bottle, a waved annular solder 9 is placed on the bottom of the double-walled bottle previously turned upside down, and then a lid member 8 is placed on the solder 9, as shown in FIG. 3. The double-walled bottle is then placed in a vacuum furnace (not shown), and the air exhausted by a series of steps diagrammed in FIG. 8.

In preliminary exhaustion step 31 of FIG. 8, the double-walled bottle is preliminarily exhausted of the air so that the pressure in the space 5 is reduced to about $10^{-2}$ Torr, and then heated to about 850° to 950° C. to remove gases adhered to or absorbed in the surfaces of the inner and outer bottles defining the space as well as to activate the copper foil 3a and the titanium foil 3b, as shown in heating and degassing step 32 of FIG. 8. Then, the double-walled bottle is further exhausted of the remaining gas so that the pressure in the space 5 is reduced to a high vacuum of about $10^{-4}$ Torr, in step 33 of FIG. 8. After the exhaustion step, the double-walled bottle is heated to a temperature of about 1000° C. under the high vacuum, so that the solder 9 is allowed to melt. Thus, the lid member 8 sinks to the bottom of the member 7 by the action of gravity and closes the suction port 6. After this, the double-walled bottle is cooled rapidly in step 35, so that the melted solder solidifies and hermetically joins the cylindrical member 7 with the lid member 8 as shown in FIG. 2, while the space is being kept at a high vacuum. The thus produced vacuum bottle possesses excellent thermal insulating properties for a long period of time as well as that of embodiment of FIG. 1. In this embodiment, the activation of titanium foil and copper foil is carried out under the reduced pressure at a temperature of not less than 700° C., so that the titanium foil can serve as a getter which absorbs hydrogen and nitrogen.

In this embodiment, it is possible to remove the absorbed gases from the surfaces of the inner and outer bottles defining the space 5 sufficiently in a short time since there remains some gases even under the reduced pressure of $1 \times 10^{-2}$ Torr, causing heat transfer due to convection as well as in the embodiment of FIG. 1. Further, it is possible to carry out the exhaustion of the remaining gases in the step 33 in a short time since the pressure in the space 5 is previously reduced to $10^{-2}$ Torr.

In addition, the copper foil 3a and titanium foil 3b are activated by heating as they release the absorbed gases such as water vapor ($H_2O$), nitrogen ($N_2$), carbon dioxide ($CO_2$), carbon monoxide (CO), etc. The copper foil 3a and titanium foil 3b absorb the gases remaining in the space 5 and released from the inner and outer bottles 2, 3 after the bottle is allowed to cool, thus making it possible to prevent the vacuum bottle from decreasing the thermal insulating properties. Since degassing from the surfaces of the double-walled bottle is carried out at a temperature beyond the temperature range where sensitization of stainless steel takes place, and then cooled rapidly, it is possible to prevent the stainless steel from intercorrosion due to sensitization.

FIG. 4 shows a vacuum-insulated, double-walled pipe used as a nonfreezing water pipe, embodying the present invention. The nonfreezing pipe comprises inner and outer shells 10 and 11, which are joined together by end closure members 13 and 14 at opposite ends of the outer shell 11 to provide an elongated cylindrical space 20. The space 20 is exhausted of air.

The inner pipe 10 is made of stainless steel pipe with an inside diameter of 22 mm and a thickness of 1 mm when used as a feed pipe, and covered with an activated copper foil 10a. Arranged between the inner pipe 10 and copper foil 10a is an activated titanium foil 10b wound on the inner pipe 10. If a nonfreezing pipe has a long length, it is preferred to provide one or more spacers on the inner shell 10 to keep the distance between the inner and outer shell 10 and 11 constant and to prevent them from contact. The outer shell 11 is made of a stainless steel pipe with an inside diameter of 42 mm and is a thickness of 1.2 mm, and provided at its upstream side with a tip tube 12 of copper for exhaustion. The outer shell 11 extends coaxially with the inner shell 10 and is fixed to the inner shell 10 by end closure members 13 and 14 at the opposite ends. The end closure members 13 and 14 are cylindrical members of stainless steel with a U-shaped cross section, and are respectively seamed to the inner and outer shells 10, 11 to provide a space between them.

At the opposite ends of the outer shell 11, there are provided caps 15 and 16 of stainless steel to cover the end closure members 13, 14, and sealant 17 is filled into spaces formed between end closure members 13, 14 and caps 15, 16. The tip tube 12 is protected by a cap 18 and the downstream cylindrical portion of the cap 16. As illustrated in FIG. 4, a cap 19 may be put on the tip tube 12 and filled with a sealant 17 to improve the thermal insulating properties of the nonfreezing pipe.

The above nonfreezing pipe may be produced in the following manner. For example, the end closure, member 13 is fitted on the inner shell 10 first so that the free ends of its cylindrical portions face outwardly, and then are joined to the outer periphery of the inner shell 10 at A by welding. On the other hand, the other end closure member 14 is fitted in one of the openings of the outer shell 11 so that the free ends of its cylindrical portions face outwardly, and are then joined at B to the inner periphery of the upstream (right) end of outer shell 11 by welding. The outer shell 11 is fitted on the inner shell 10 from the upstream (right) end of inner shell 10 until the upstream end of inner shell 10 protrudes beyond the end closure member 14 for the determined distance.

After concentrically aligning or orienting the inner and outer shells 10 and 11, the end closure members 13 and 14 are respectively joined to the internal wall portion of the outer shell 11 and the external wall portion of the inner shell 10 at C and D to form an annular space 20 surrounding the inner shell 10. During the fitting step, the tip ends of the inner and outer shells 10 and 11 do not come into contact with each other, thus making it possible to form a pipe of a double-walled construction easily and smoothly without damaging the copper foil 10a wound on the inner shell 10.

The space 20 of the resultant double-walled pipe is exhausted in the same manner as in the embodiment shown in FIG. 1. When heating the double-walled pipe in the furnace, the temperature of the outer shell 11 rises first, and then the temperature of the inner shell 10 rises. Thus, the outer shell 11 provides higher thermal expansion as compared to the inner shell 10. For this reason, the end closure members 13 and 14 are deformed by the stress acting thereon in the directions indicated by arrows a and b in FIG. 4. When cooling the pipe, the outer shell 11 provides larger shrinkage as compared to the inner shell 10 because of a higher cooling rate of the outer shell, so that the end closure members 13 and 14 are deformed by the stress acting thereon in the reverse directions indicated by arrows a' and b' in FIG. 4.

As will be understood from the above, the thermal stress produced in the outer and inner shells are absorbed by the end closure members 13 and 14, thus making it possible to prevent the welded portions of the pipe from cracking during the exhausting step.

In the embodiment shown in FIGS. 4 and 5, the tip tube 12 is used for exhaustion of air, but may be replaced with a suction port previously provided in the outer shell. In this case, the suction port is closed with a lid member in the same manner as in the embodiment of FIGS. 2 and 3. Similar results can be obtained.

Figure 9:
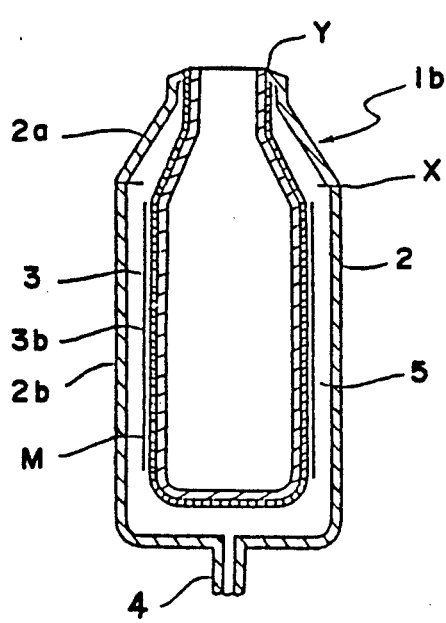
FIG. 9 is a section view of a vacuum-insulated double-walled vessel, showing another embodiment of the present invention.

FIG. 9 shows another embodiment of a vacuum-insulated, double-walled vessel of the present invention. The vacuum bottle 1b has the same structure as that of the embodiment of FIG. 1 except that an inner vessel 3 is provided at its outer surface with a plating M of copper or silver to prevent heat transfer due to radiation, and that a barrel portion of the inner vessel 3 is covered only with an activated titanium foil 3b having a thickness of 25 $\mu$m and a weight of 0.8 g. The activated titanium foil 3b may be fixed on the inner surface of the outer vessel 2 by spot welding. The space 5 formed between the outer and inner vessel 2 and 3 is exhausted of air.

In this embodiment, the titanium foil 3b is activated by heating it at a temperature of 700° C. and above under a low vacuum ranging from 100 Torr to $10^{-2}$ Torr. This activated titanium foil absorbs all the gasses such as nitrogen, hydrogen, carbon monoxide, etc., which remain in the space 5 or are released from the surfaces of the inner and outer vessels defining the vacuum space 5. Accordingly, it is possible to keep the space at a high vacuum.

Figure 10:
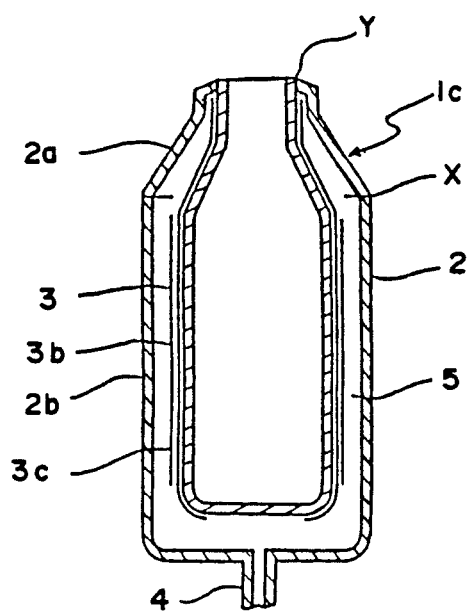
FIG. 10 is a section view of a vacuum-insulated double-walled vessel, showing another embodiment of the present invention.
Figure 11:
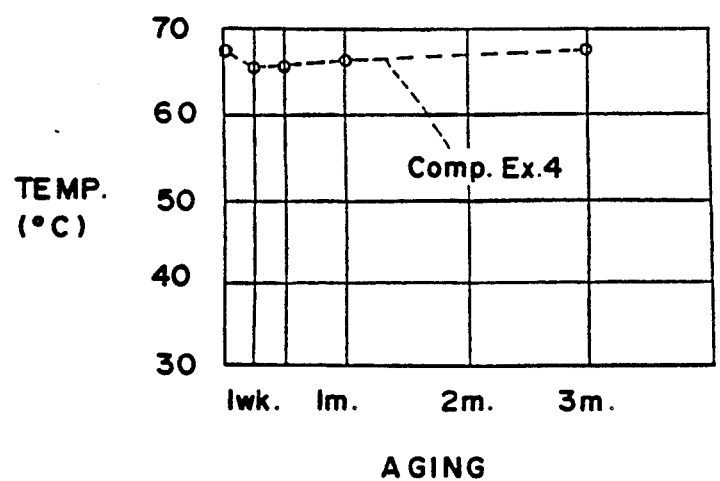
FIGS. 11 to 14 are graphs showing thermal insulating properties of double-walled structures of the prior art.
Figure 12:
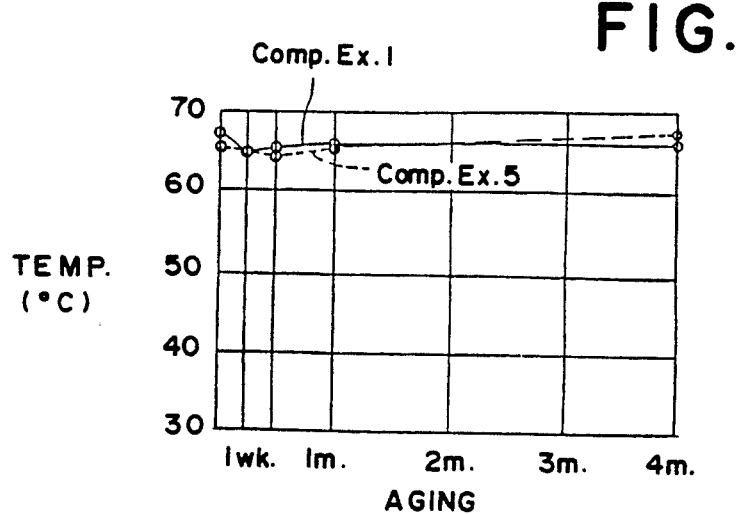
Figure 13:
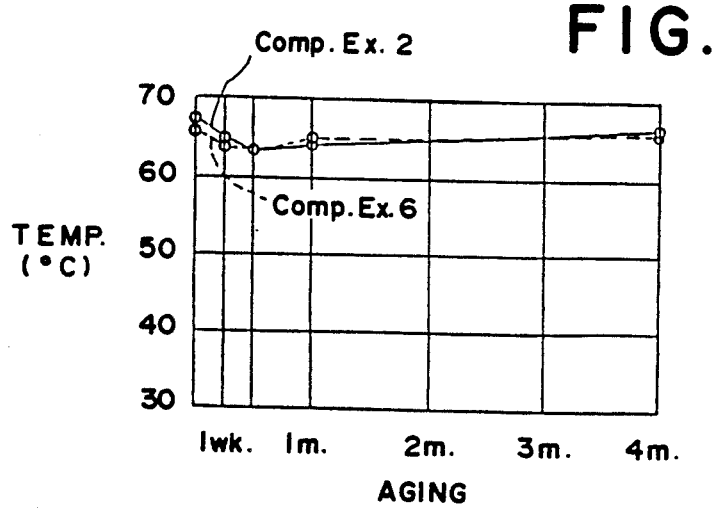
Figure 14:
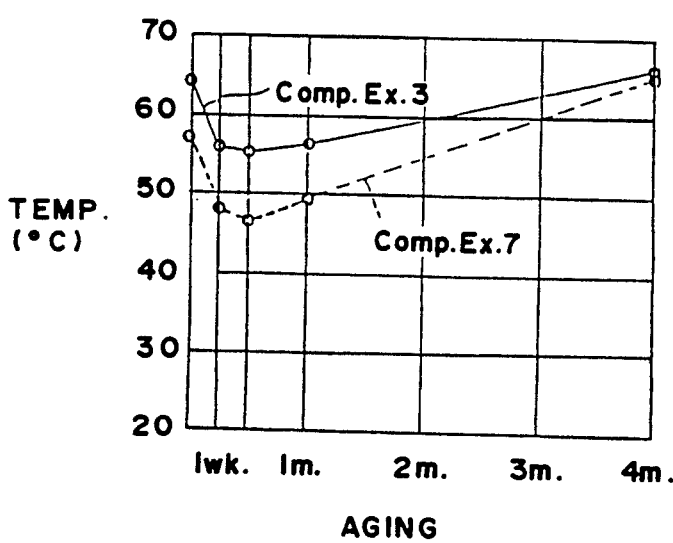

Referring now to FIG. 10, there is shown another embodiment of a vacuum-insulated, double-walled vessel of the present invention. The vacuum bottle 1c has the same structure as that of the embodiment of FIG. 1 except that an inner vessel 3 is covered with an aluminum foil 3c, and that a part of the aluminum foil 3c is covered with an activated titanium foil 3b. The activated titanium foil 3b may be fixed on the inner surface of the outer vessel 2 by spot welding. The space 5 formed between the outer and inner vessel 2 and 3 is exhausted of air.

In this embodiment, the titanium foil 3b is activated by heating it at a temperature of not less than 700° C. under a low vacuum ranging from 100 Torr to $10^{-2}$ Torr. This activated titanium foil absorbs all the gasses such as nitrogen, hydrogen, carbon monoxide, etc., which remain in the space 5 or are released from the surfaces of the inner and outer vessels defining the vacuum space 5. Accordingly, it is possible to keep the space at a high vacuum.

EXAMPLE 1

In order to determine the thermal insulating properties of the vacuum bottles of the present invention, there were prepared samples of vacuum bottles in the same manner as above under the conditions listed in Table 1. The thickness of copper and titanium foils are also listed in Table 1. Then, grease was removed from the inner surface of each vacuum bottle in accordance with the well known process.

TABLE 1

| Sample | Foil | (μm) | Exhaustion conditions |
|---|---|---|---|
| 1 | Cu | 16.5 | Preliminary exhaust: 1 Torr |
|   | Ti | 25 | Degassing: 10 min, 450° C., 1 Torr |
| 2 | Cu | 9 | Vacuum exhaust: 40 min, 450° C., $10^{-5}$ Torr |
|   | Ti | 25 | |

For each vacuum bottle, the thermal insulating properties were determined by measurement of a temperature of hot water poured in the vacuum bottle and allowed to stand for 24 hours in an atmosphere of 20° C. The initial temperature of the hot water was 95° C. and the vacuum bottle was corked and allowed to stand for that time. This test was carried out (1) just after production of each vacuum bottle, (2) one week later, (3) two weeks later, (4) four weeks later, (5) three months later, and (6) four months later from the date of production. During the test period, each vacuum bottle was kept in an atmosphere of 95° C. Results are shown in Table 2. The data in this table are the mean for five samples.

TABLE 2

| Sample | Thickness (μm) | | Water Temperature (°C.) | | | |
|---|---|---|---|---|---|---|
| | | | Initial | 1 week | 2 weeks | 4 weeks |
| 1 | Ti | 25 | 67.6 | 66.6 | 66.7 | 67.7 |
|   | Cu | 16.5 | | | | |
| 2 | Ti | 25 | 68.5 | 67.7 | 67.5 | 68.1 |

TABLE 2-continued

| Sample | Thickness (μm) | | Water Temperature (°C.) | | | |
|---|---|---|---|---|---|---|
| | | | Initial | 1 week | 2 weeks | 4 weeks |
|   | Cu | 9 | | | | |

For comparison, there were prepared comparative samples of vacuum bottles in the following manner.

COMPARATIVE EXAMPLE 1

Using the same stainless steel sheet used in Example 1, there were prepared upper and lower members for the outer bottle and an inner bottle in the same manner as in Example 1. The lower member was then provided at a central portion of its bottom with a tip tube. The inner bottle was heated in air to form an oxidized film on its outer surface, and then covered with a copper foil of a thickness of 16.5 μm except for a top end of its neck portion and a central part of the bottom that faces the opening of the tip tube. The inner bottle was seamed at the tip of the neck portion with the upper member of the outer bottle, and then the lower member of the outer bottle was seamed with the upper member to form a double-walled bottle with a space between the inner and outer bottles.

The thus prepared double-walled bottle was placed in a furnace, and its tip tube was connected to a vacuum pump. The space between the inner and outer bottle was exhausted of air through the tip tube for 70 minutes. After exhaustion, the double-walled bottle was heated at a temperature of 400° to 450° C., and the tip tube 4 was then pinched off to complete a vacuum bottle.

COMPARATIVE EXAMPLE 2-3

Vacuum bottles were prepared in the same manner as in Comparative example 1 except that the exhaustion of air was carried out for 50 or 30 minutes.

COMPARATIVE EXAMPLES 4-7

Vacuum bottles were prepared in the same manner as in Comparative example 1 except that removal of grease on the inner bottle was carried out instead of formation of oxidized film, and that exhaustion of air was carried out for 100, 70, 50 and 30 minutes, respectively.

For each comparative sample, the thermal insulating properties were determined in the same manner as above. Results are shown in FIGS. 11-14.

From the results shown in Table 2, the thermal insulating properties of the vacuum bottles of the present invention scarcely vary with the lapse of time, and its change falls within 1 degree. In contrast therewith, the thermal insulating properties of the vacuum bottle of the prior art are greatly lowered in one or two weeks, as shown in FIGS. 11 to 14. Thus, the vacuum bottle of the present invention is superior to that of the prior art.

Further, the present invention makes it possible to shorten the time required for exhaustion of air.

What is claimed is:

1. A method for producing a vacuum-insulated, double-walled metal structure having a suction port or tip tube, comprising the steps of: preparing an inner shell member and an outer shell member; covering an outer surface of said inner shell member with at least one metal foil selected from the group consisting of copper, titanium and zirconium; seaming said inner shell member and said outer shell member together to prepare a double-walled structure with a space between them;

preliminarily exhausting air from said space so that a pressure in said space becomes reduced to a low vacuum of the order of $10^{-2}$ Torr; heating said double-walled structure at a temperature not less than about 400° C. to remove gases as well as to activate said at least one metal foil; further exhausting air from said space so that the pressure therein is reduced to a high vacuum of the order of $10^{-4}$ Torr; and then sealing said suction port or tip tube.

2. The method for producing a vacuum-insulated, double-walled metal structure according to claim 1, further including the steps of: arranging a getter between said inner shell member and metal foil, while winding said metal foil on said inner shell member.

* * * * *

UNITED STATES PATENT AND TRADEMARK OFFICE
CERTIFICATE OF CORRECTION

PATENT NO. : 4,997,124
DATED : March 5, 1991
INVENTOR(S) : Akihiro Kitabatake et al It is certified that error appears in the above-identified patent and that said Letters Patent is hereby corrected as shown below:

Column 6, line 40, the "," between "cylindrical" and "member" should be deleted.

Column 7, line 54, "is" should be deleted, and between "and" (second occurrence) and "provided" insert --is--.

Signed and Sealed this

Twenty-fourth Day of November, 1992

Attest:

DOUGLAS B. COMER

*Attesting Officer*     *Acting Commissioner of Patents and Trademarks*